(12) United States Patent
Vitale et al.

(10) Patent No.: US 9,334,459 B2
(45) Date of Patent: *May 10, 2016

(54) METHOD AND COMPOSITION FOR PREVENTING OXIDATION

(71) Applicant: MIDWEST INDUSTRIAL SUPPLY, INC., Canton, OH (US)

(72) Inventors: Robert W. Vitale, Canton, OH (US); Cheryl L. Detloff, Canton, OH (US)

(73) Assignee: Midwest Industrial Supply, Inc., Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,977

(22) Filed: Feb. 6, 2015

(65) Prior Publication Data

US 2015/0307799 A1 Oct. 29, 2015

Related U.S. Application Data

(63) Continuation of application No. 14/262,389, filed on Apr. 25, 2014, now Pat. No. 9,018,287.

(60) Provisional application No. 61/816,006, filed on Apr. 25, 2013.

(51) Int. Cl.

| *C10L 10/00* | (2006.01) |
| *C10L 5/32* | (2006.01) |
| *C08K 5/42* | (2006.01) |
| *C08K 5/00* | (2006.01) |
| *C08K 5/41* | (2006.01) |

(52) U.S. Cl.
CPC . *C10L 10/00* (2013.01); *C08K 5/00* (2013.01); *C08K 5/41* (2013.01); *C08K 5/42* (2013.01); *C10L 5/32* (2013.01); *C10L 2200/0263* (2013.01); *C10L 2200/0295* (2013.01); *C10L 2200/04* (2013.01); *C10L 2230/081* (2013.01); *C10L 2250/04* (2013.01)

(58) Field of Classification Search
CPC ........ C10L 10/00; C10L 5/32; C10L 2200/04
See application file for complete search history.

(56) References Cited

U.S. PATENT DOCUMENTS

| 4,551,261 A | 11/1985 | Salihar |
| 4,594,268 A | 6/1986 | Kirwin |
| 4,746,543 A | 5/1988 | Zinkan et al. |
| 4,801,635 A | 1/1989 | Zinkan et al. |
| 5,576,056 A | 11/1996 | Roe |
| 8,052,890 B2 | 11/2011 | Nguyen |
| 8,465,667 B2 | 6/2013 | Davis et al. |
| 9,018,287 B2 * | 4/2015 | Vitale ..................... C10L 10/00 524/166 |
| 2005/0161234 A1 | 7/2005 | Turunc et al. |
| 2006/0011885 A1 * | 1/2006 | Christmas ................ C11D 1/83 252/186.1 |
| 2012/0118590 A1 | 5/2012 | Mathis |

FOREIGN PATENT DOCUMENTS

| CA | 2 417 294 | 2/2002 |
| EP | 0 595 772 | 5/1994 |
| JP | 56 133 392 | 10/1981 |
| JP | 2000 096 040 | 4/2000 |
| WO | 92 15 371 | 9/1992 |
| WO | 2012-123-778 | 9/2012 |

OTHER PUBLICATIONS

Daniels J.L., Mehta P., Vaden M., Sweem D., Mason M.D., Zavareh M., Ogunro V., "Nano-Scale Organo-Silane Applications in Geotechnical and Geoenvironmental Engineering," Journal of Terraspace Science and Engineering 1(1), 2009, pp. 1-9.

* cited by examiner

*Primary Examiner* — Robert Harlan
(74) *Attorney, Agent, or Firm* — Emerson Thomson Bennett, LLC; Daniel A. Thomson

(57) ABSTRACT

A composition for inhibiting oxidation includes an anionic, hydrophilic, water soluble polymer, an anionic surfactant, and water.

8 Claims, 13 Drawing Sheets

METHOD AND COMPOSITION FOR PREVENTING OXIDATION

Figure 1:
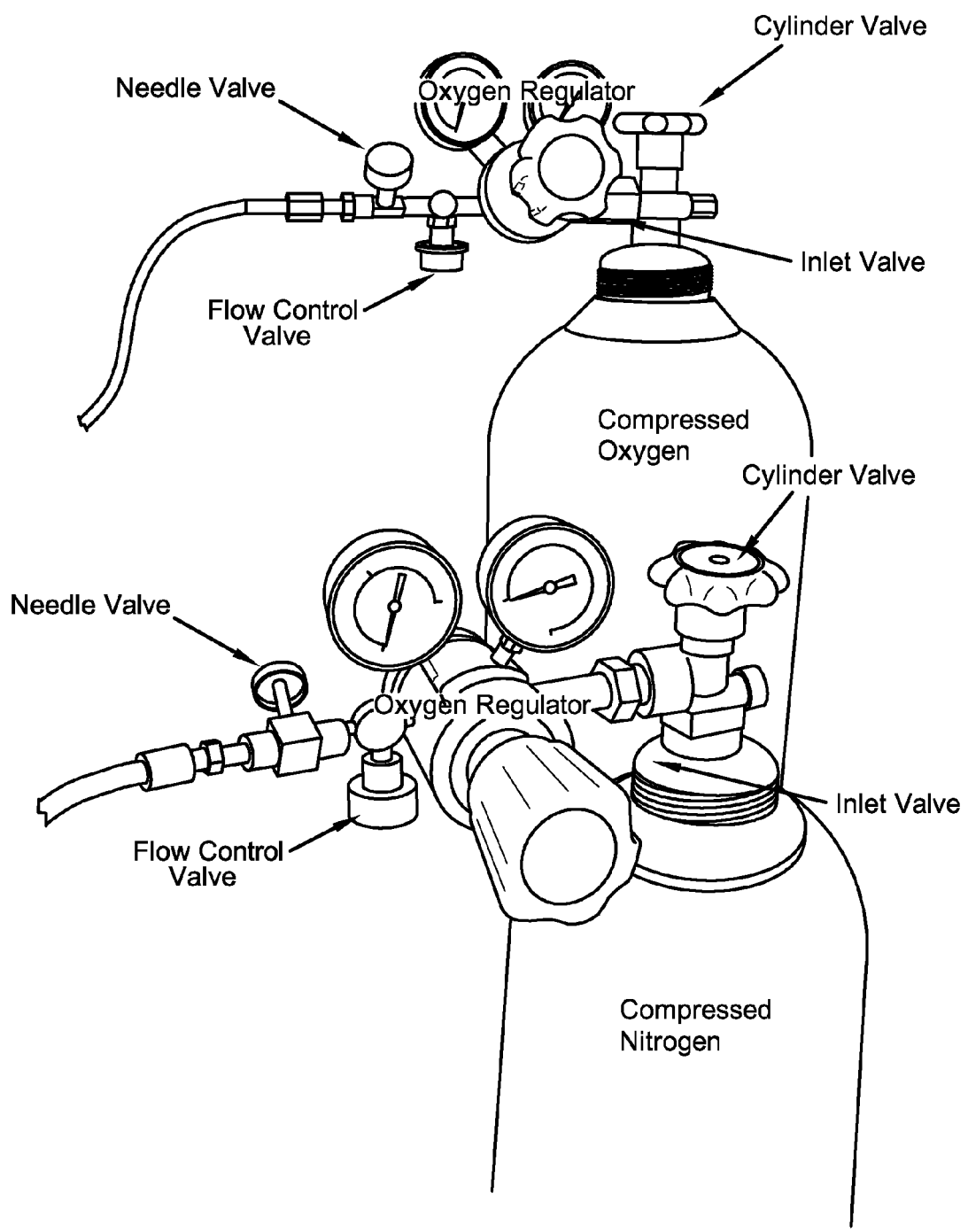

This application is a continuation of U.S. patent application Ser. No. 14/262,389, filed Apr. 25, 2014, and claims priority to U.S. Provisional Patent Appln. No. 61/816,006, filed Apr. 25, 2013, the contents of which are incorporated herein by reference.

I. BACKGROUND

1. Technical Field

This invention relates to preventing oxidation, and particularly inhibiting coal oxidation.

2. Background

U.S. Pat. No. 5,576,056 discloses a method of inhibiting coal oxidation in a coal pile comprising coating all the surfaces of coal exposed to air with an oxidation inhibiting amount of a composition consisting essentially of a water soluble cationic polymer diluted in an aqueous solution.

Coal exportation has been a growing market but the self-heating property of coal has presented many risks. Upon exposure to air, coal will oxidize and generate heat. The heat that is generated accumulates and can cause ignition of the coal body. If a mass of coal burns, then there are health risks involved for the workers that will be exposed to the fumes, environmental concerns as large amounts of noxious gases are emitted, and the product is lost in transit. Coal can spend up to a couple weeks in a railcar and up to a month in the hold of a ship. A large mass of coal given that much time to heat up is going to be prone to spontaneous combustion. Due to the risks involved with spontaneous combustion, a treatment method to inhibit this reaction is needed.

Spontaneous combustion of coal is the process of self-heating resulting eventually in its ignition without the application of external heat. Coal when exposed to air absorbs oxygen at the uncovered surface. Some fraction of the exposed coal substance absorbs oxygen at a faster rate than others and the oxidation results in the formation of gases. Mainly CO, $CO_2$, water vapor along with the evolution of heat during the chemical reaction. If the rate of dissipation of heat is slow with respect to the evolution of heat by oxidation there is a gradual buildup of heat and temperature reaches the ignition point of coal thereby causing fire.

Favorable conditions for spontaneous heating are accumulation of heat caused by a rise in temperature and hence an increase in the reaction rate. Although, at ambient temperature, the reaction can be so slow that it is unnoticed, when heat accumulates the temperature is raised and, the reaction rate increases exponential. The increased rate of reaction can be described by Arrhenius law, $v=c_r c_o A e^{(Ea/RT)}$, where v=reaction (mol/g·s), $c_r$=combustible concentration (kg/m$^3$), $c_o$=oxygen concentration, A=Arrhenius Frequency Factor (s$^{-1}$ or s$^{-1}$C$^{1-n}$), $E_a$=Activation energy (kJ/mole), R=universal gas constant=8.314 J/mole·K, and T=temperature (K). The oxidation rate equation of coal was established according to the chemical kinetic equations of spontaneous combustion of coal. Coal oxidation is an exothermic reaction. The equation of this exothermic reaction is: coal+$O_2$→production+Q, where Q is the oxidation reaction heat, J/mol.

The law of mass action in chemical kinetic reactions shows that the reaction rate is a function of the concentration of the reactant at a given temperature. The rate of reaction of spontaneous combustion of coal is as follows: $K'=kC^m_c C^n_{O2}$ where K' is the rate of reaction, k the reaction rate constant and m+n the reaction index. Mass experiments have shown that temperature has a great effect on the rate of chemical reaction. Under normal conditions, as the temperature rises 10° C., the reaction rate will increase approximately 2 to 4 times. The rate of coal oxidation increases quickly as the reaction temperature rises. The rate equation of chemical reaction is: $k=k_0^{(-/RT)}$ where k is the reaction rate constant. Various units can be used according to different circumstances. For example, the amount of oxide production per unit time is expressed in mol/s; $k_0$ is the frequency factor, with the same unit as k; E is the activation energy, J/mol, and R the gas constant: R=8.314 J/mole·K. Using the mathematical model of the shortest spontaneous coal combustion period and the basic theory of thermodynamics, the equation for the time of spontaneous combustion of coal at the prevailing temperatures is as follows: $t=(C_p(T_{kp}-T_0)+W_p\lambda/100)/(3600\times 24 K_{cp}C_{O2}Q)$, where t represents the time from normal temperature to the critical temperature, d; $T_0$ is the original temperature of the coal-rock mass; $T_{kp}$ is the critical temperature causing the coal temperature to rise, K; $W_p$ is the total content of water in the coal, %; $C_p$ is the average specific heat of the coal from normal temperature to the critical temperature, J/kg·K); $\lambda$ represents the absorption heat when water evaporates J/kg; Q is the absorption heat of coal absorbing oxygen, J/m$^3$ and $K_{cp}$ is the velocity constant of absorption of oxygen during the period of $(T_0-T_{kp}$, m$^3$/(kg·s).

The propensity of colliery wastes to combust spontaneously, is related to the specific ability of seams or splits of seams to self-heat during or after mining. The instances of burning coal wastes are increasing with the increase in the percentage of coal mined by open cut methods. Wastes created in open cut mining often contain coal from seams and splits that for either reasons of quality and/or thickness are not reclaimed. This coal is often blended with the overburden by the heavy machinery used in mining, and if liable to spontaneous combustion results in numerous pockets of heating across and through the wastes. This process of spreading the source of heating through the overburden makes reclamation of mined out areas very awkward and in two cases reclamation has failed over large areas due to spontaneous combustion.

Spontaneous combustion in washery rejects has also been a problem in with coal from certain seams. Washery rejects can be seen burning after many years in a number of locations in New South Wales. The extent of environmental impact of such reject fires however is less in potential than that from burning overburden, in that the rejects are normally more concentrated and not as extensive (and therefore more easily disposed of by deep burial) as overburden. Colliery rejects are also often able to be re-washed to obtain otherwise lost coal values, while at the same time reducing the propensity for spontaneous combustion.

Other sources of environmental damage from coal spontaneous combustion are burning coal stockpiles and in situ coal seams. These sources of pollution are normally short lived due to the economic cost of losing mined or minable coal.

There are number factor which contribute to the process of spontaneous combustion of coal. The most important parameters involved in the process of spontaneous combustion of coal are: Factors inherent to coal—size of the coal particles and surface area, moisture content, coal composition, quality and rank of coal, and heat conductivity of the particles; Extrinsic conditions——degree of compaction, temperature, barometric pressure, oxygen concentration, and dimensions and shape of stockpile.

II. SUMMARY

In accordance with one aspect of the invention, a composition includes anionic polyacrylamide (anionic PAM), sodium alpha olefin sulfonate (sodium AOS), and water.

In accordance with another aspect of the invention, a composition includes a hydrophilic, synthetic, water soluble polymer, sodium alpha olefin sulfonate (sodium AOS), and water.

In accordance with another aspect of the invention, a composition includes methylcellulose, sodium alpha olefin sulfonate (sodium AOS), and water.

In accordance with another aspect of the invention, a composition includes a xanthan gum, sodium alpha olefin sulfonate (sodium AOS), and water.

In accordance with another aspect of the invention, a composition includes a guar gum, sodium alpha olefin sulfonate (sodium AOS), and water.

In accordance with another aspect of the invention, a composition includes a lignin sulfonate, sodium alpha olefin sulfonate (sodium AOS), and water.

In accordance with another aspect of the invention, a composition includes anionic polyacrylamide (anionic PAM), ammonium lauryl sulfate, and water.

In accordance with another aspect of the invention, a composition includes a hydrophilic, synthetic, water soluble polymer, ammonium lauryl sulfate, and water.

In accordance with another aspect of the invention, a composition includes methylcellulose, ammonium lauryl sulfate, and water.

In accordance with another aspect of the invention, a composition includes a xanthan gum, ammonium lauryl sulfate, and water.

In accordance with another aspect of the invention, a composition includes a guar gum, ammonium lauryl sulfate, and water.

In accordance with another aspect of the invention, a composition includes a lignin sulfonate, ammonium lauryl sulfate, and water.

In accordance with another aspect of the invention, a composition includes anionic polyacrylamide (anionic PAM), sodium lauryl sulfate, and water.

In accordance with another aspect of the invention, a composition includes a hydrophilic, synthetic, water soluble polymer, sodium lauryl sulfate, and water.

In accordance with another aspect of the invention, a composition includes methylcellulose, sodium lauryl sulfate, and water.

In accordance with another aspect of the invention, a composition includes a xanthan gum, sodium lauryl sulfate, and water.

In accordance with another aspect of the invention, a composition includes a guar gum, sodium lauryl sulfate, and water.

In accordance with another aspect of the invention, a composition includes a lignin sulfonate, sodium lauryl sulfate, and water.

In accordance with another aspect of the invention, a composition includes anionic polyacrylamide (anionic PAM), sodium dioctyl solfosuccinate (SDOSS), a co-solvent, and water.

In accordance with another aspect of the invention, a composition includes a hydrophilic, synthetic, water soluble polymer, SDOSS, a co-solvent, and water.

In accordance with another aspect of the invention, a composition includes methylcellulose, SDOSS, a co-solvent, and water.

In accordance with another aspect of the invention, a composition includes a xanthan gum, SDOSS, a co-solvent, and water.

In accordance with another aspect of the invention, a composition includes a guar gum, SDOSS, a co-solvent, and water.

In accordance with another aspect of the invention, a composition includes a lignin sulfonate, SDOSS, a co-solvent, and water.

In accordance with another aspect of the invention, a composition includes anionic polyacrylamide (anionic PAM), sodium dioctyl solfosuccinate (SDOSS), ethanol/glycerin, and water.

In accordance with another aspect of the invention, a composition includes a hydrophilic, synthetic, water soluble polymer, SDOSS, ethanol/glycerin, and water.

In accordance with another aspect of the invention, a composition includes methylcellulose, SDOSS, ethanol/glycerin, and water.

In accordance with another aspect of the invention, a composition includes a xanthan gum, SDOSS, ethanol/glycerin, and water.

In accordance with another aspect of the invention, a composition includes a guar gum, SDOSS, ethanol/glycerin, and water.

In accordance with another aspect of the invention, a composition includes a lignin sulfonate, SDOSS, ethanol/glycerin, and water.

In accordance with another aspect of the invention, a composition includes anionic polyacrylamide (anionic PAM), sodium dioctyl solfosuccinate (SDOSS), isopropyl alcohol/glycerin, and water.

In accordance with another aspect of the invention, a composition includes a hydrophilic, synthetic, water soluble polymer, SDOSS, isopropyl alcohol/glycerin, and water.

In accordance with another aspect of the invention, a composition includes methylcellulose, SDOSS, isopropyl alcohol/glycerin, and water.

In accordance with another aspect of the invention, a composition includes a xanthan gum, SDOSS, isopropyl alcohol/glycerin, and water.

In accordance with another aspect of the invention, a composition includes a guar gum, SDOSS, isopropyl alcohol/glycerin, and water.

In accordance with another aspect of the invention, a composition includes a lignin sulfonate, SDOSS, isopropyl alcohol/glycerin, and water.

In accordance with another aspect of the invention, a composition includes anionic polyacrylamide (anionic PAM), sodium dioctyl solfosuccinate (SDOSS), ethanol/glycol, and water.

In accordance with another aspect of the invention, a composition includes a hydrophilic, synthetic, water soluble polymer, SDOSS, ethanol/glycol, and water.

In accordance with another aspect of the invention, a composition includes methylcellulose, SDOSS, ethanol/glycol, and water.

In accordance with another aspect of the invention, a composition includes a xanthan gum, SDOSS, ethanol/glycol, and water.

In accordance with another aspect of the invention, a composition includes a guar gum, SDOSS, ethanol/glycol, and water.

In accordance with another aspect of the invention, a composition includes a lignin sulfonate, SDOSS, ethanol/glycol, and water.

In accordance with another aspect of the invention, a composition includes anionic polyacrylamide (anionic PAM), sodium dioctyl solfosuccinate (SDOSS), isopropyl alcohol/glycol, and water.

In accordance with another aspect of the invention, a composition includes a hydrophilic, synthetic, water soluble polymer, SDOSS, isopropyl alcohol/glycol, and water.

In accordance with another aspect of the invention, a composition includes methylcellulose, SDOSS, isopropyl alcohol/glycol, and water.

In accordance with another aspect of the invention, a composition includes a xanthan gum, SDOSS, isopropyl alcohol/glycol, and water.

In accordance with another aspect of the invention, a composition includes a guar gum, SDOSS, isopropyl alcohol/glycol, and water.

In accordance with another aspect of the invention, a composition includes a lignin sulfonate, SDOSS, isopropyl alcohol/glycol, and water.

For all of the above aspects, the anionic PAM, the hydrophilic, synthetic water soluble polymer, the methylcellulose, the xanthan gum, the guar gum, and the lignin sulfonate can be between about 0.1% to about 20% by weight, and within this range, can be between about 0.1% to about 10% by weight and can be between about 10% to about 20% by weight. The sodium AOS, the ammonium lauryl sulfate, and the sodium lauryl sulfate, can be between about 2% to about 38% by weight, and within this range, can be between about 2% to about 8% by weight, and can be between about 8% to about 38% by weight. The water can be between about 42% to about 97.9% by weight, and within this range can be between about 42% to about 82% by weight and can be between about 82% to about 97.9% by weight. When using SDOSS, the SDOSS is between about 0.4% to about 4.8% by weight, the co-solvent is between about 1.0% to about 11.1% by weight, and the water is between about 64.1% to about 98.5% by weight.

Accordingly, several objects and advantages of the invention are the ability to effectively inhibit spontaneous combustion.

Still further objects and advantages will become apparent from a consideration of the ensuing description and accompanying drawings.

III. BRIEF DESCRIPTION OF THE DRAWINGS

Figure 2:
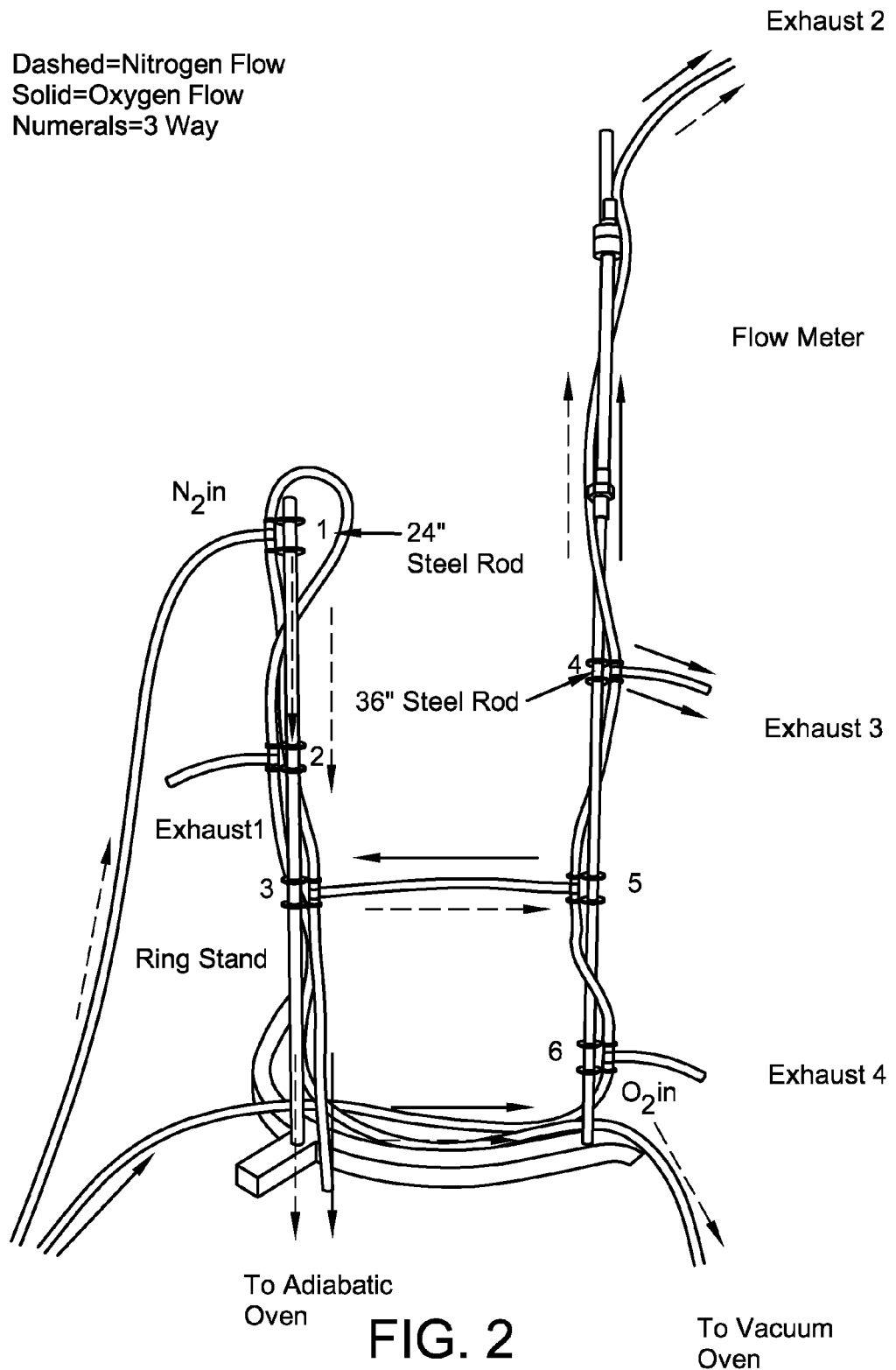
Figure 3:
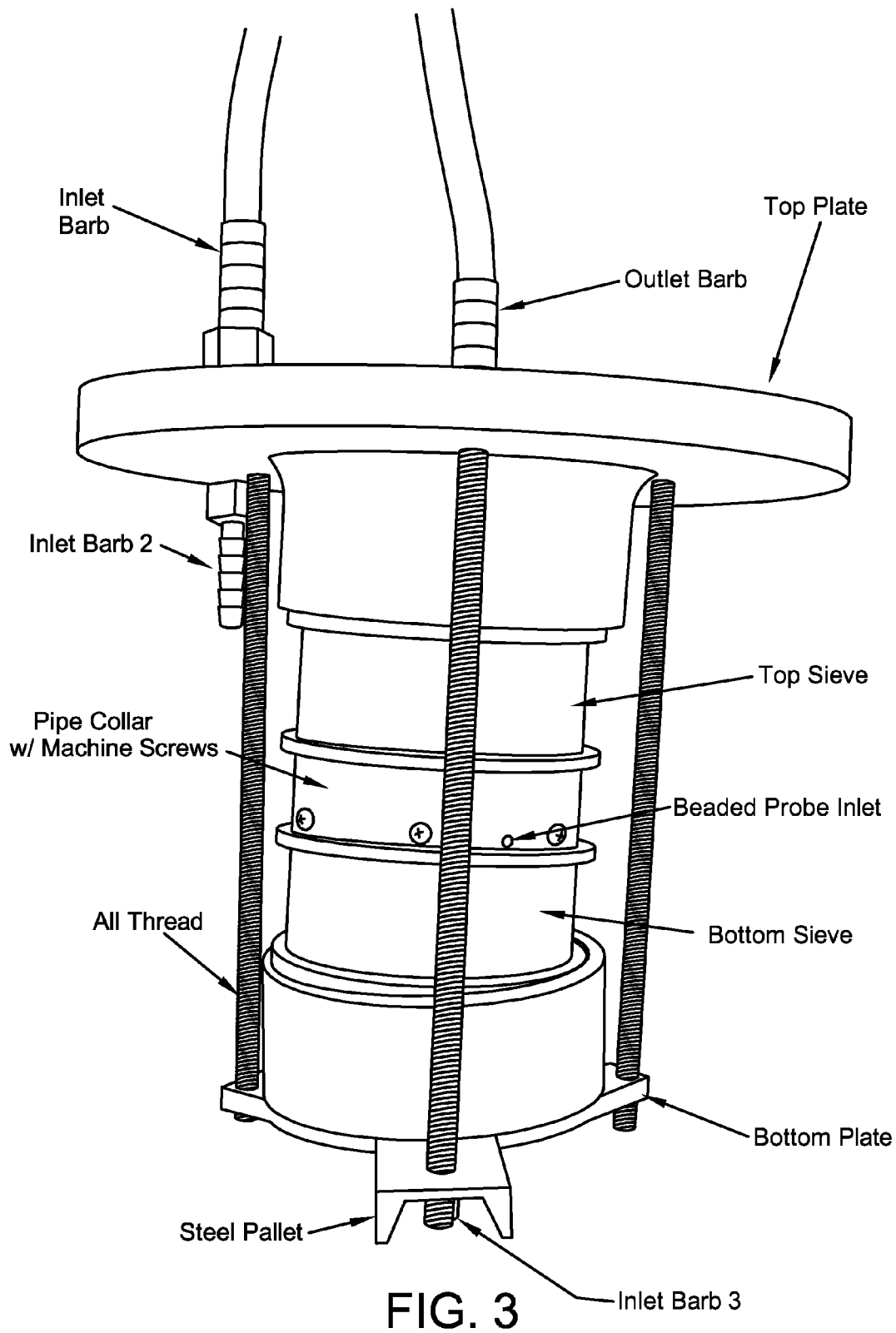
Figure 4:
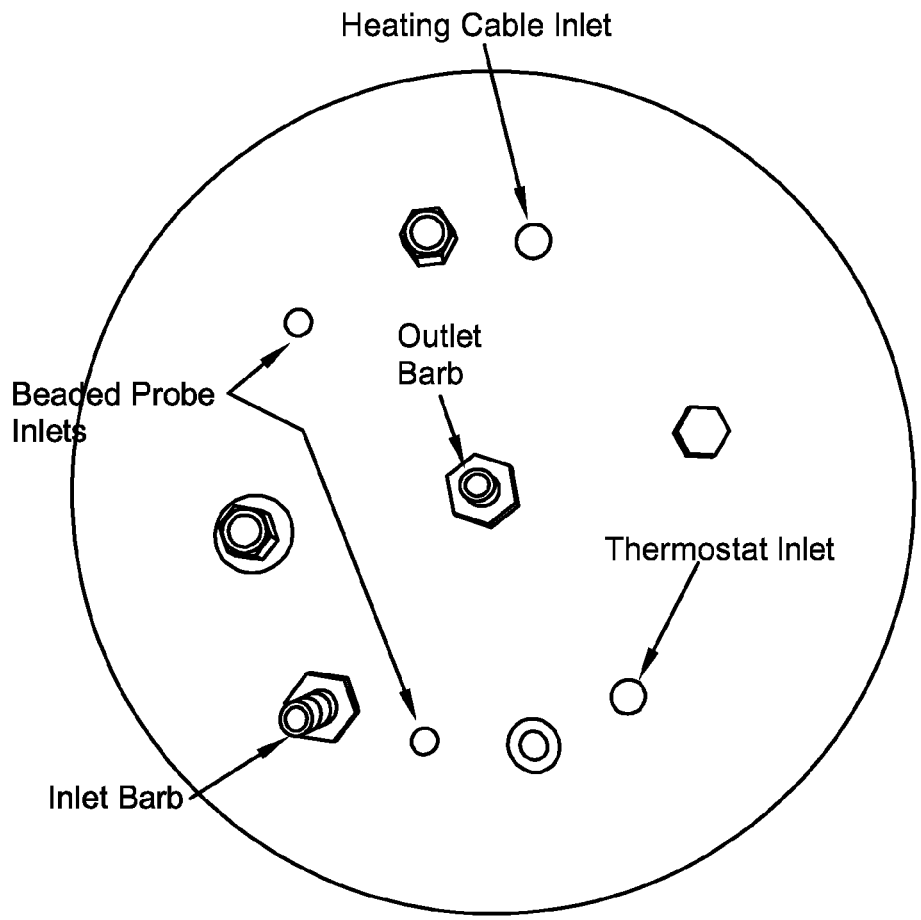
Figure 5:
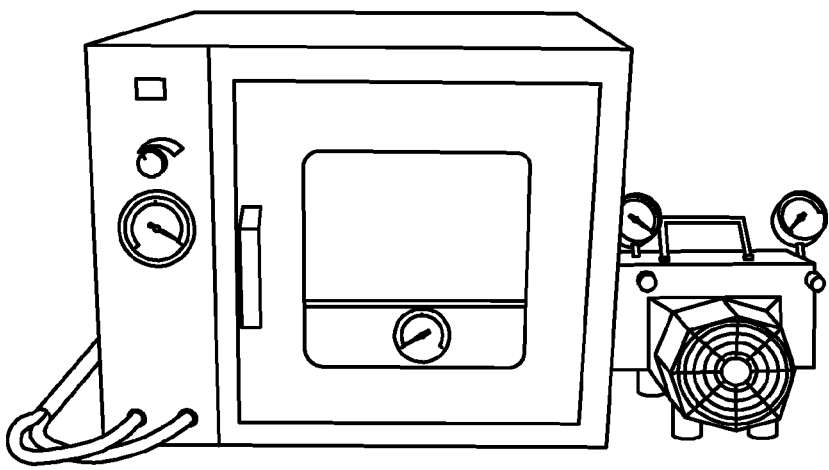
Figure 6:
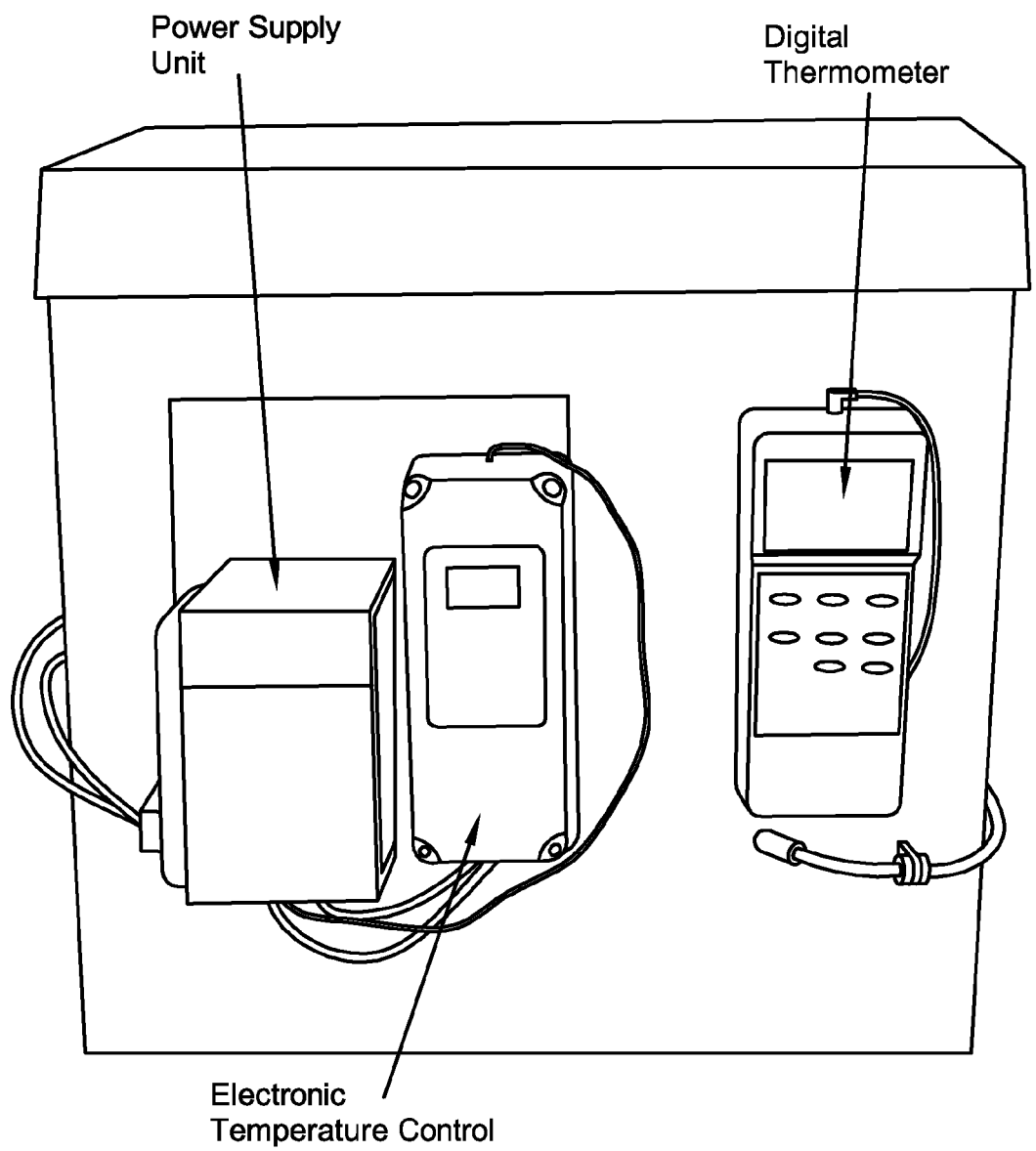
Figure 7:
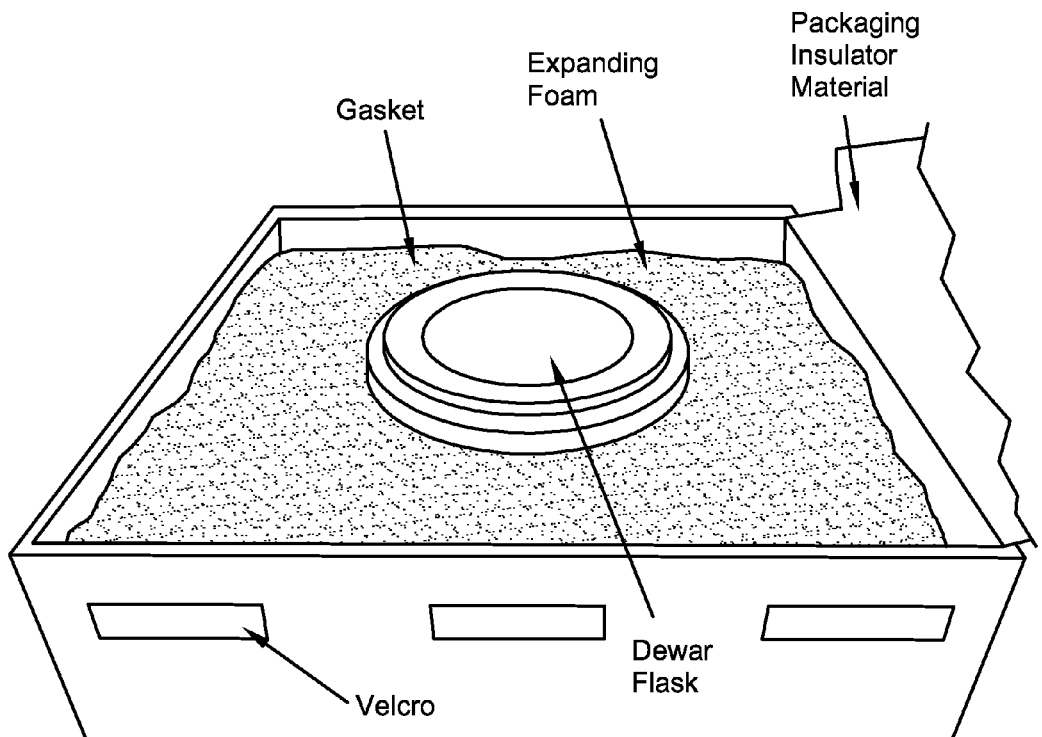
Figure 8:
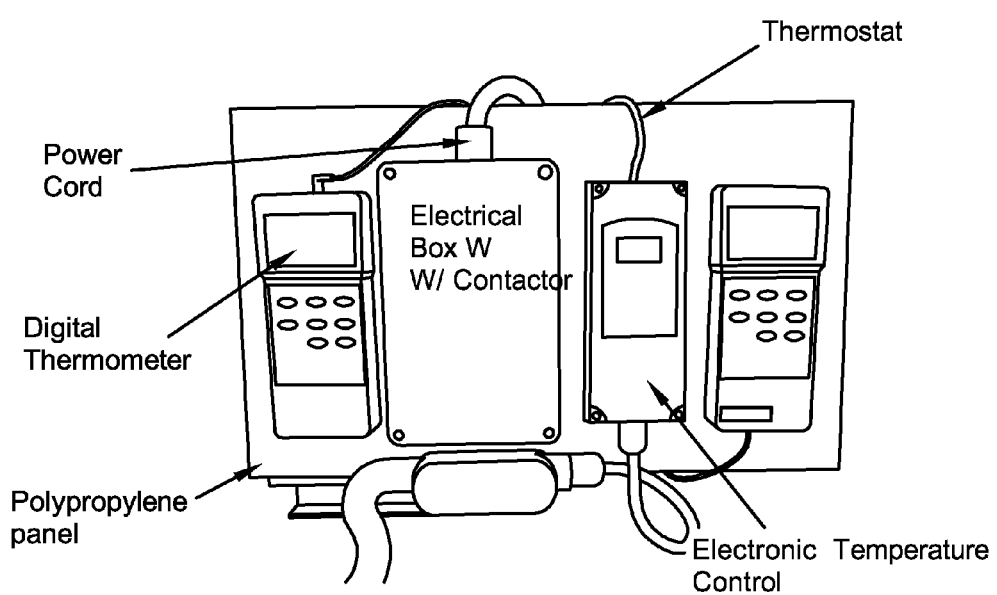
Figure 9:
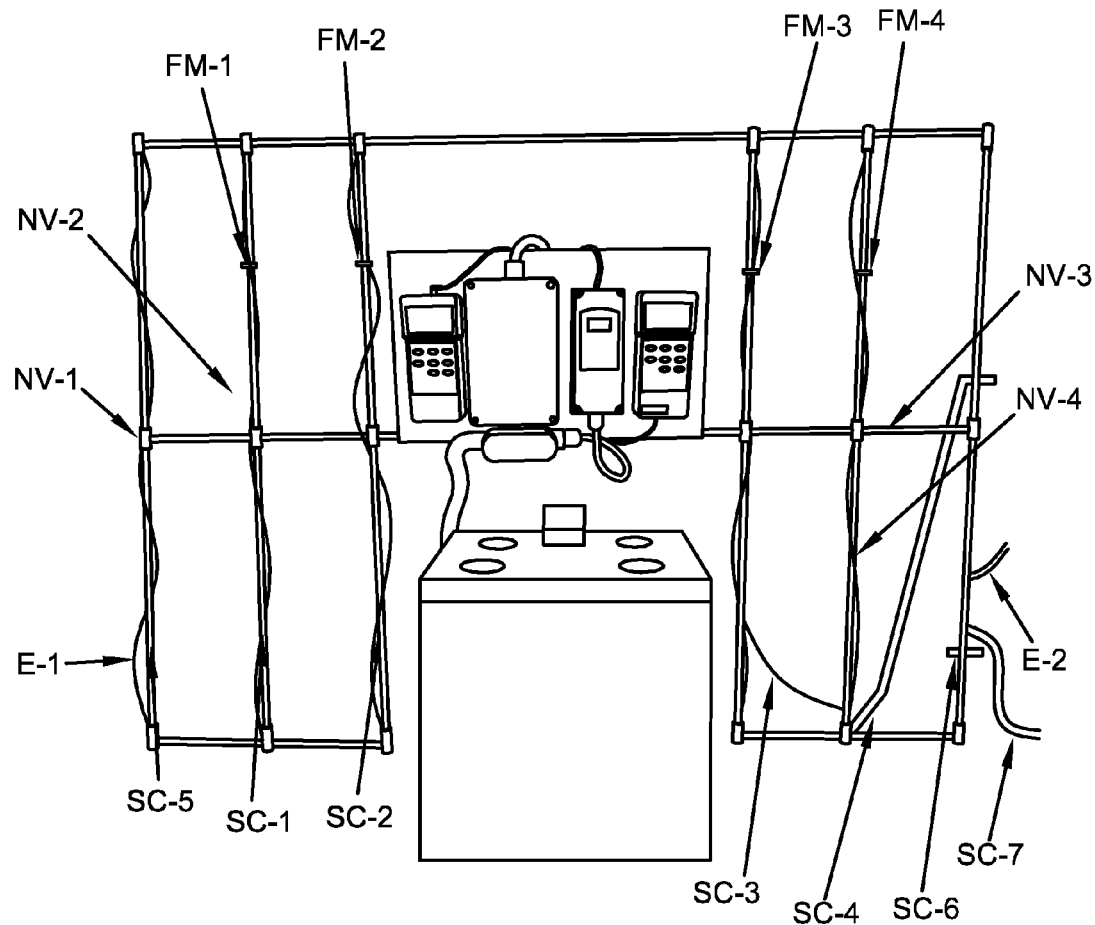
Figure 10:
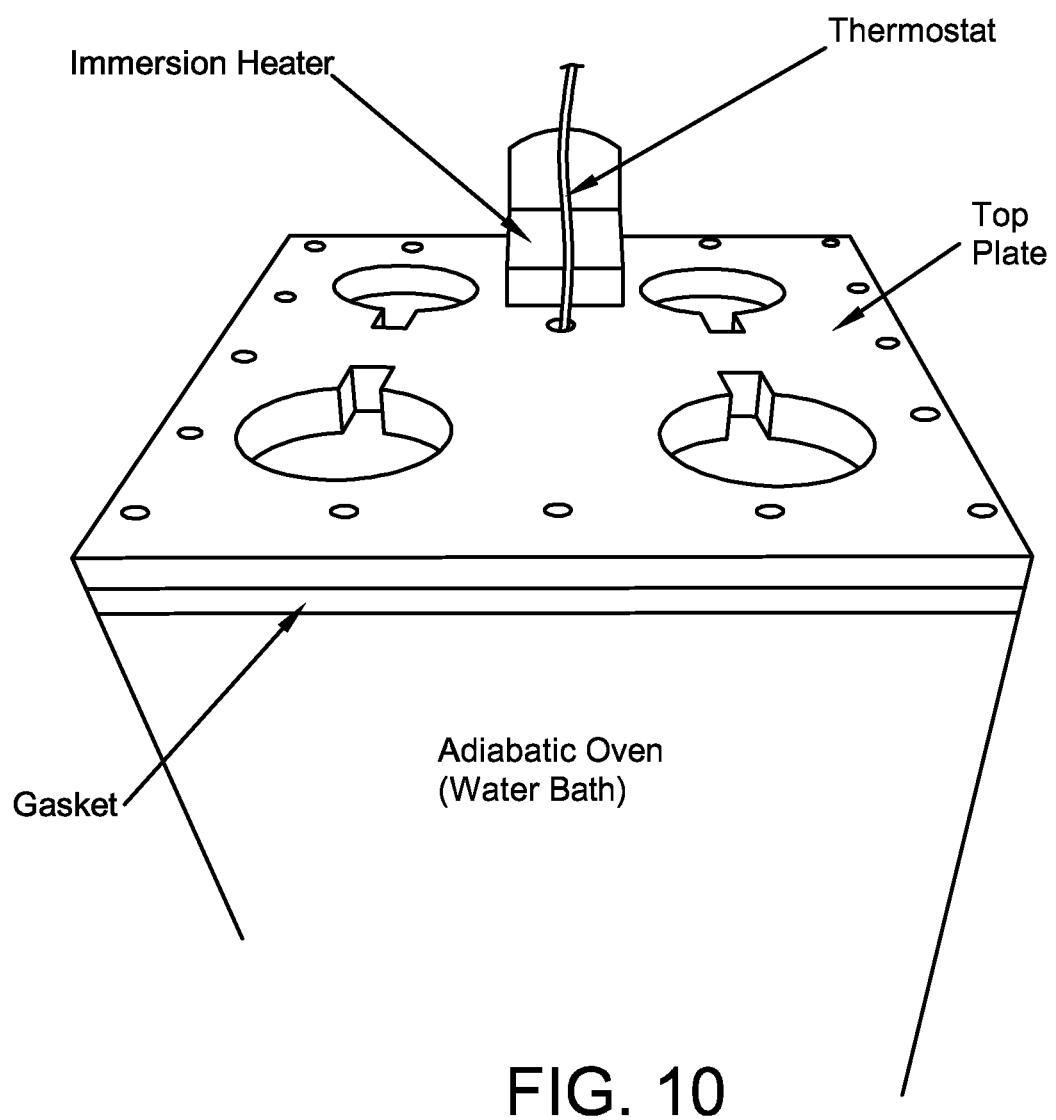
Figure 11:
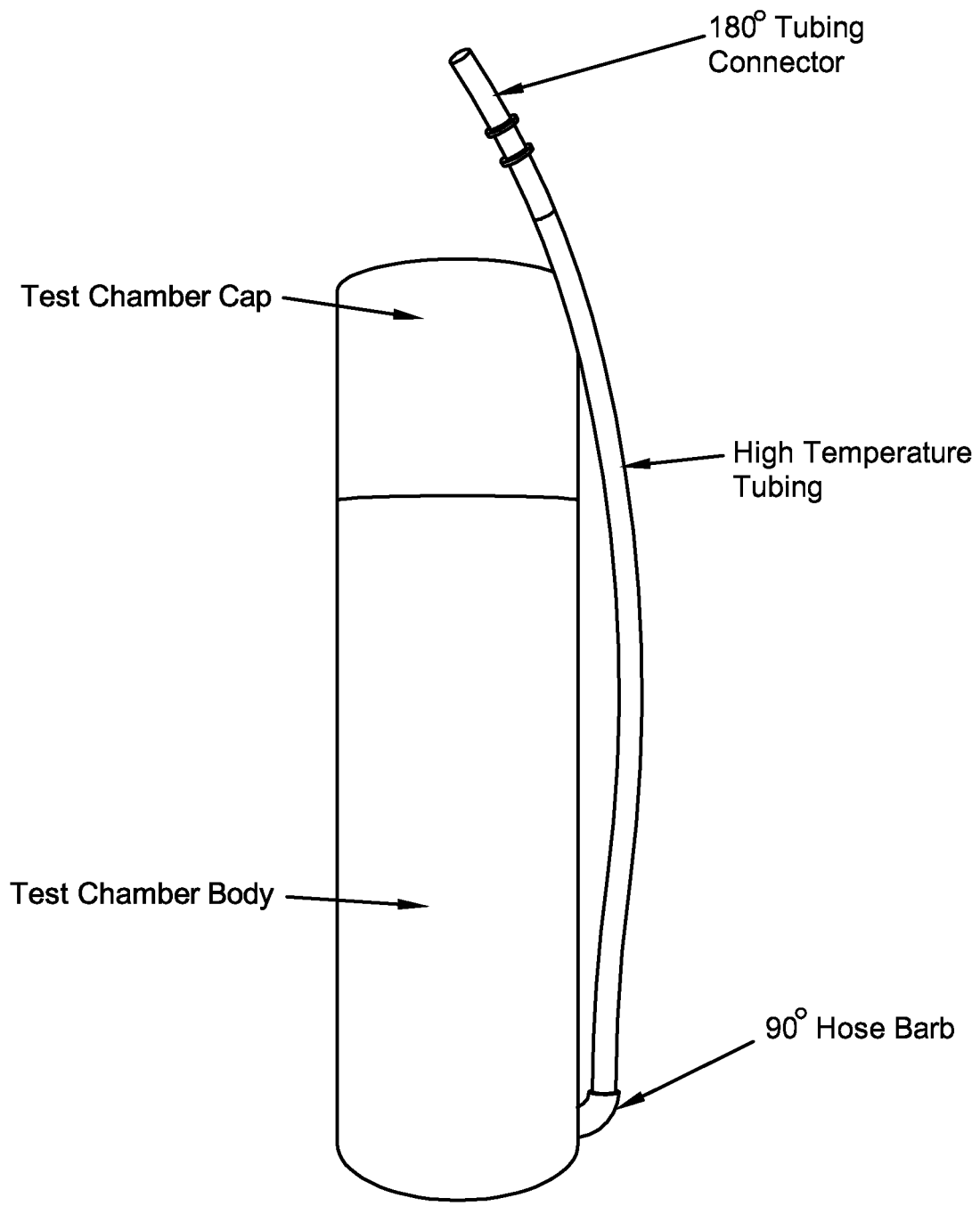
Figure 12:
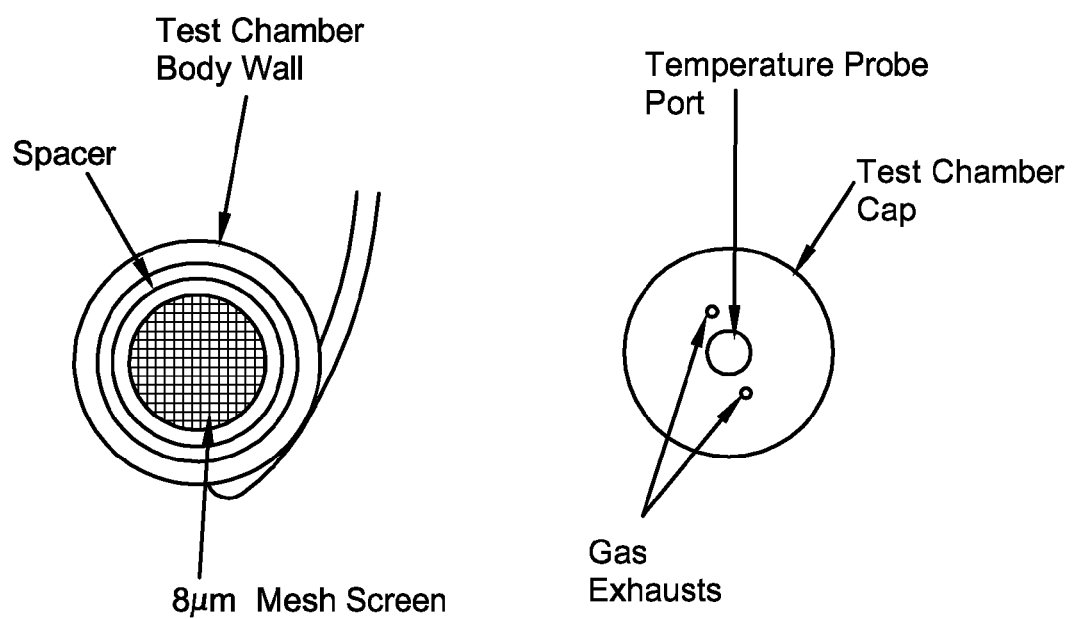
Figure 13:
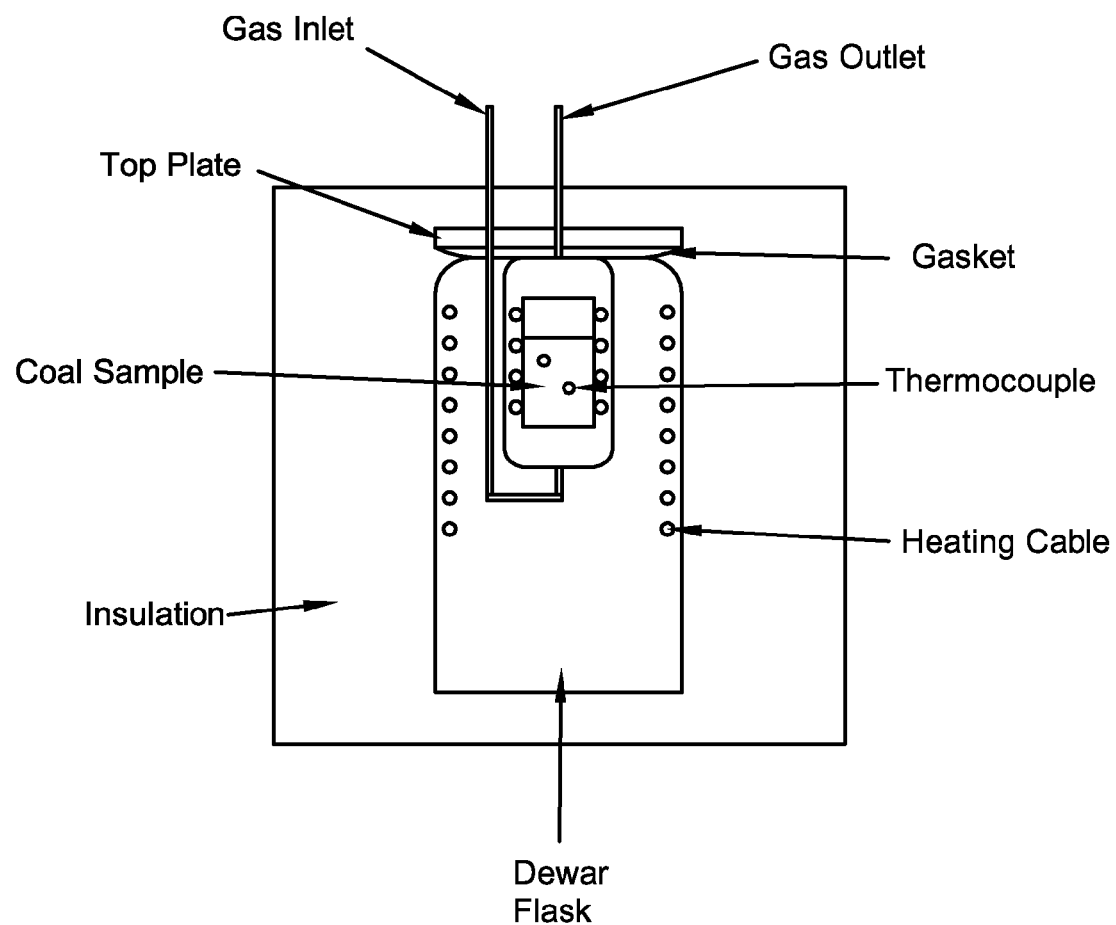
Figure 14:
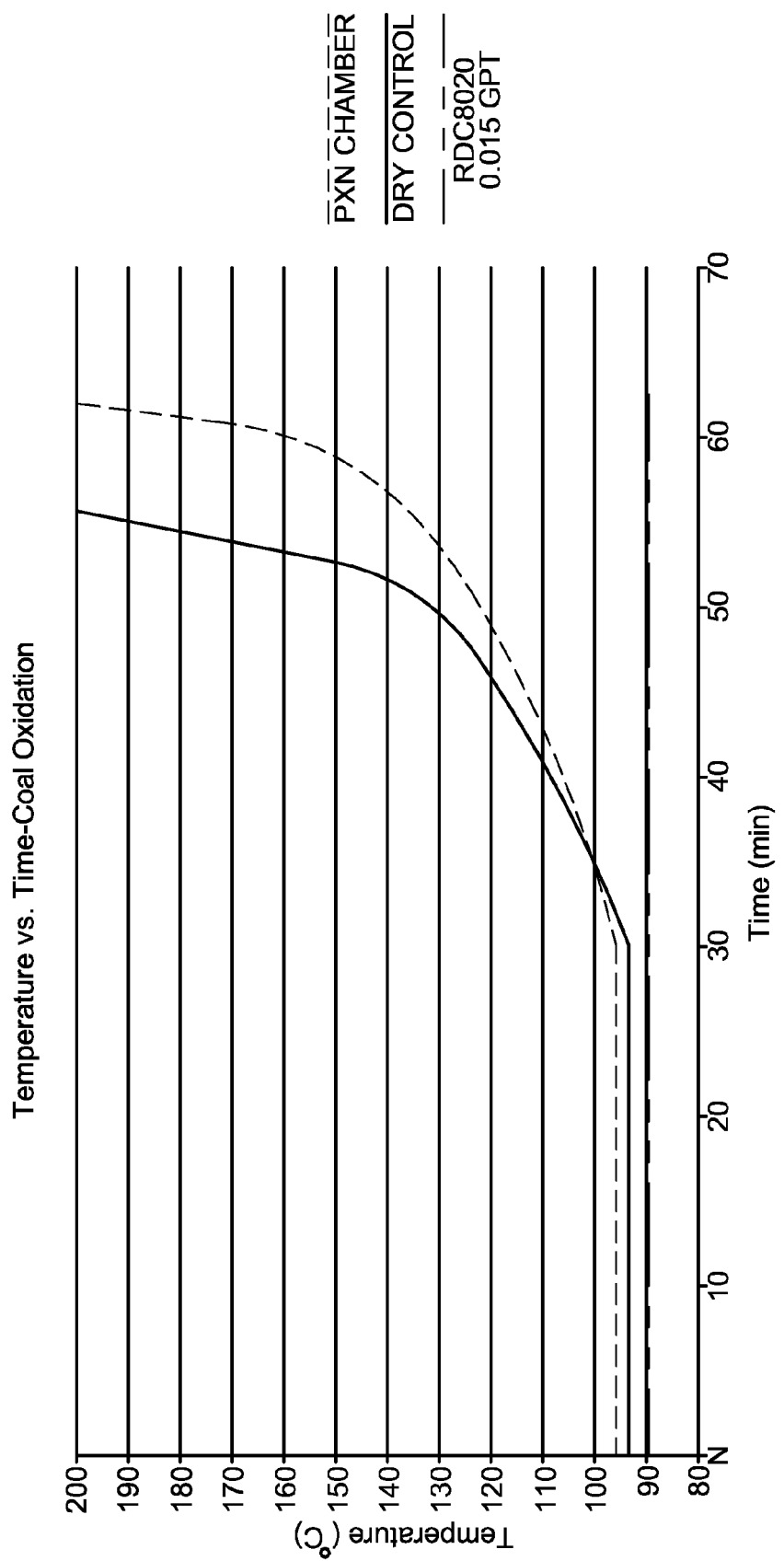
Figure 15:
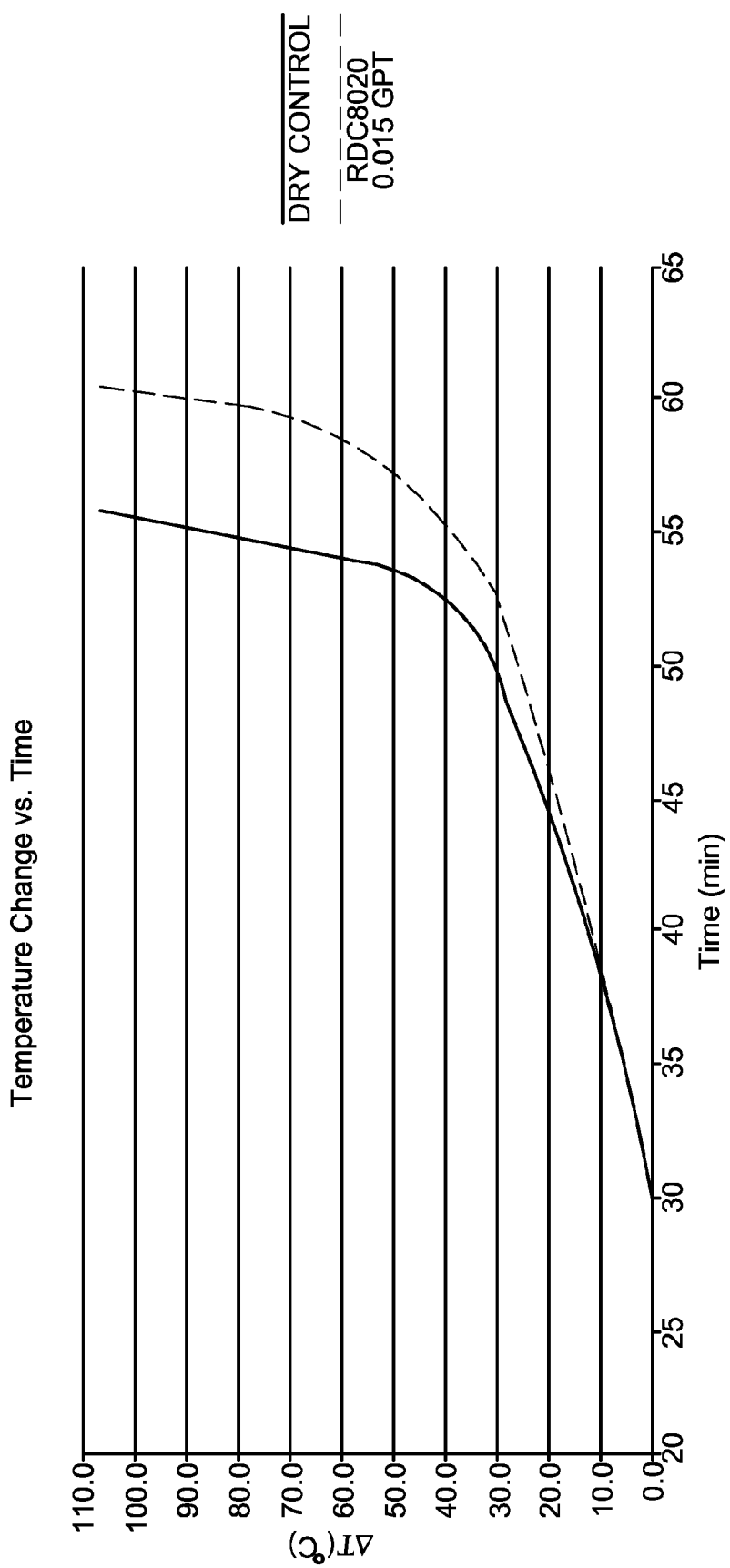

The invention may take physical form in certain parts and arrangement of parts, at least one embodiment of which will be described in detail in this specification and illustrated in the accompanying drawings which form a part hereof and wherein:

FIG. 1 shows gas cylinders;
FIG. 2 shows a gas lattice;
FIG. 3 shows a side view of a sample chamber;
FIG. 4 shows a top view of the sample chamber;
FIG. 5 shows a vacuum oven and vacuum pump;
FIG. 6 shows a front view of an adiabatic oven;
FIG. 7 shows a top view of the adiabatic oven;
FIG. 8 shows a control panel;
FIG. 9 shows a lattice and the adiabatic oven;
FIG. 10 shows the adiabatic oven;
FIG. 11 shows a side view of a test chamber;
FIG. 12 shows a top view of the test chamber;
FIG. 13 shows a schematic of the adiabatic oven;
FIG. 14 shows test data of temperature v. time-coal oxidation; and,
FIG. 15 shows test data of temperature change v. time.

IV. DETAILED DESCRIPTION

In one embodiment, a composition for inhibiting and delaying oxidation includes anionic polyacrylamide (anionic PAM), sodium alpha olefin sulfonate (sodium AOS), and water. Polyacrylamide is a polymer ($-CH_2CHCONH_2-$) formed from acrylamide subunits. It can be synthesized as a simple linear-chain structure or cross-linked, typically using N,N'-methylenebisacrylamide. PAM is a hydrophilic, synthetic, water soluble polymer. Sodium AOS, which is a mild anionic surfactant, is used as a wetting agent. In one embodiment the anionic PAM is about 10% by weight, the sodium AOS is about 8% by weight, and the water is about 82% by weight. In this embodiment, the anionic PAM can be between about 0.1% to about 20% by weight (including, but not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, and 20), the sodium AOS can be between about 2% and about 38% by weight (including, but not limited to, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, and 38), and the water can be between about 42% and about 97.9 percent by weight (including, but not limited to, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, and 97.9). In this embodiment, the anionic PAM can be between about 0.1% to about 10% by weight and can be between about 10% to about 20% by weight, the sodium AOS can be between about 2% to about 8% by weight and can be between about 8% to about 38% by weight, the water can be between about 42% to about 82% by weight and can be between about 82% to about 97.9% by weight.

Although anionic PAM is used in the above embodiment, it is to be understood that other hydrophilic, water soluble, synthetic polymers can also be used. One example of another polymer that can be used is methylcellulose. The methylcellulose can be between about 0.1% to about 20% by weight (including, but not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, and 20), and within this range can be between about 0.1% to about 10% by weight and can be between about 10% to about 20% by weight. Beside the anionic PAM and methylcellulose, naturally occurring biopolymers can also be used. Examples of these biopolymers are xanthan gum, guar gum, and lignin sulfonate. The ranges for the biopolymers are the same as the ranges for the anionic PAM and methylcellulose.

It is to be understood that, beside sodium AOS, other anionic surfactants can also be used. Examples of these surfactants are ammonium lauryl sulfate, sodium lauryl sulfate, and sodium dioctyl sulfosuccinate (SDOSS). The two lauryl sulfates can be between about 2% to about 38% by weight (including, but not limited to, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, and 38), and within this range can be between about 2% to about 8% by weight and can be between about 8% to about 38% by weight. When SDOSS is used, a co-solvent is used to facilitate complete solubility in water. The SDOSS is between about 0.4% to about 4.8% by weight, the co-solvent is between about 1.0% to about 11.1% by weight, and the water is between about 64.1% to about 98.5% by weight. In all of the embodiments that do not use SDOSS, the composition can be utilized without a solvent.

In one embodiment, the composition includes anionic PAM, SDOSS, diethylene glycol, isopropyl alcohol, and water, wherein the diethylene glycol/isopropyl alcohol is a co-solvent to facilitate complete solubility of the SDOSS in the water. In one embodiment, the anionic PAM is 10% by weight, the SDOSS is 1.6% by weight, the diethylene glycol is 3.5% by weight, the isopropyl alcohol is 0.2% by weight, and the water is 84.7% weight. Within this embodiment, the anionic PAM can be between about 0.1% to about 20% by weight (including, but not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, and 20), and within this range can be between about 0.1% to about 10% by weight and can be between about 10% to about 20% by weight, the SDOSS can be between about 0.4% to about 4.8% (including, but not limited to, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8 3.9, 4.0, 4.1, 4.2, 4.3, 4.4, 4.5, 4.6, 4.7, and 4.8) by weight, and within this range can be between about 0.4% to 1.6% by weight and can be between about 1.6% to about 4.8% by weight, the co-solvent can be between about 1.0% to about 11.1% by weight (including, but not limited to 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, and 11.1), and within this range can between about 1.0% to about 3.7% by weight and can be between about 3.7% to about 11.1% by weight, and the water can be between about 64.1% to about 98.5% by weight (64.1, 64.2, 64.3, 64.4, 64.5, 64.6, 64.7, 64.8, 64.9, 65.0, 65.1, 65.2, 65.3, 65.4, 65.5, 65.6, 65.7, 65.8, 65.9, 66.0, 66.1, 66.2, 66.3, 66.4, 66.5, 66.6, 66.7, 66.8, 66.9, 67.0, 67.1, 67.2, 67.3, 67.4, 67.5, 67.6, 67.7, 67.8, 67.9, 68.0, 68.1, 68.2, 68.3, 68.4, 68.5, 68.6, 68.7, 68.8, 68.9, 69.0, 69.1, 69.2, 69.3, 69.4, 69.5, 69.6, 69.7, 69.8, 69.9, 70.0, 70.1, 70.2, 70.3, 70.4, 70.5, 70.6, 70.7, 70.8, 70.9, 71.0, 71.1, 71.2, 71.3, 71.4, 71.5, 71.6, 71.7, 71.8, 71.9, 72.0, 72.1, 72.2, 72.3, 72.4, 72.5, 72.6, 72.7, 72.8, 72.9, 73.0, 73.1, 73.2, 73.3, 73.4, 73.5, 73.6, 73.7, 73.8, 73.9, 74.0, 74.1, 74.2, 74.3, 74.4, 74.5, 74.6, 74.7, 74.8, 74.9, 75.0, 75.1, 75.2, 75.3, 75.4, 75.5, 75.6, 75.7, 75.8, 75.9, 76.0, 76.1, 76.2, 76.3, 76.4, 76.5, 76.6, 76.7, 76.8, 76.9, 77.0, 77.1, 77.2, 77.3, 77.4, 77.5, 77.6, 77.7, 77.8, 77.9, 78.0, 78.1, 78.2, 78.3, 78.4, 78.5, 78.6, 78.7, 78.8, 78.9, 79.0, 79.1, 79.2, 79.3, 79.4, 79.5, 79.6, 79.7, 79.8, 79.9, 80.0, 80.1, 80.2, 80.3, 80.4, 80.5, 80.6, 80.7, 80.8, 80.9, 81.0, 81.1, 81.2, 81.3, 81.4, 81.5, 81.6, 81.7, 81.8, 81.9, 82.0, 82.1, 82.2, 82.3, 82.4, 82.5, 82.6, 82.7, 82.8, 82.9, 83.0, 83.1, 83.2, 83.3, 83.4, 83.5, 83.6, 83.7, 83.8, 83.9, 84.0, 84.1, 84.2, 84.3, 84.4, 84.5, 84.6, 84.7, 84.8, 84.9, 85.0, 85.1, 85.2, 85.3, 85.4, 85.5, 85.6, 85.7, 85.8, 85.9, 86.0, 86.1, 86.2, 86.3, 86.4, 86.5, 86.6, 86.7, 86.8, 86.9, 87.0, 87.1, 87.2, 87.3, 87.4, 87.5, 87.6, 87.7, 87.8, 87.9, 88.0, 88.1, 88.2, 88.3, 88.4, 88.5, 88.6, 88.7, 88.8, 88.9, 89.0, 89.1, 89.2, 89.3, 89.4, 89.5, 89.6, 89.7, 89.8, 89.9, 90.0, 90.1, 90.2, 90.3, 90.4, 90.5, 90.6, 90.7, 90.8, 90.9, 91.0, 91.1, 91.2, 91.3, 91.4, 91.5, 91.6, 91.7, 91.8, 91.9, 92.0, 92.1, 92.2, 92.3, 92.4, 92.5, 92.6, 92.7, 92.8, 92.9, 93.0, 93.1, 93.2, 93.3, 93.4, 93.5, 93.6, 93.7, 93.8, 93.9, 94.0, 94.1, 94.2, 94.3, 94.4, 94.5, 94.6, 94.7, 94.8, 94.9, 95.0, 95.1, 95.2, 95.3, 95.4, 95.5, 95.6, 95.7, 95.8, 95.9, 96.0, 96.1, 96.2, 96.3, 96.4, 96.5, 96.6, 96.7, 96.8, 96.9, 97.0, 97.1, 97.2, 97.3, 97.4, 97.5, 97.6, 97.7, 97.8, 97.9, 98.0, 98.1, 98.2, 98.3, 98.4, and 98.5) and within this range can be between 64.1% to 84.7% by weight and can be between about 84.7% to about 98.5% by weight. In this embodiment, the co-solvent is diethylene glycol/isopropyl alcohol, wherein the diethylene glycol can be between about 0.9% to about 10.5% by weight (including, but not limited to, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, and 10.5) and within this range can be between about 0.9% to about 3.5% by weight and can be between about 3.5% to about 10.5% by weight, and the isopropyl alcohol can be between about 0.1% to about 0.6% by weight (including, but not limited to, 0.1, 0.2, 0.3, 0.4, 0.5, and 0.6) and within this range can be between about 0.1% to about 0.2% by weight, and can be between about 0.2% to about 0.6% by weight.

The composition, in any of its embodiment, can be applied as a treatment in a water spray or foam during coal handling processes, such as loading railcars, trucks, and ships, or into coal stockpiles. The composition is diluted with water at a rate of about 1 part composition to about 50 to about 400 parts water by weight. The water spray or foam application has the benefit of decreasing airborne dust during handling operations.

The composition, in any of its embodiments, can be applied as a surface treatment once a vessel is loaded or the stockpile created. The composition is diluted with water at a rate of about 1 part composition to about 10 to about 25 parts water by weight. The surface treatment application has the benefit of decreasing airborne particulates during short term storage of coal.

The composition has three mechanisms that slow the oxidation process, and delay or eliminate the incidence of spontaneous combustion. The composition penetrates into the surface of the particles, and fills voids (creating no place for the oxygen to attach to reactive sites on the particles), blocks infiltration of oxygen into the voids, and slows evaporation of water. As water evaporates from low ranked coal, it causes small fissures in the surface to expand and split the larger particles into smaller particles, thereby exposing new sites for oxidation to occur, so the slowing of evaporation helps slow oxidation. The composition also coats the surface of the particles, acting as a barrier to oxygen attack. The composition also binds smaller particles together, thereby reducing potential for impact during transit, minimizing breaking of the coal, which would expose new surfaces. It also reduces friction between particles, and since friction generates heat and heat exacerbates spontaneous combustion, the reduction of friction is an added benefit.

EXAMPLE 1

In one embodiment of the present invention, coal was separated into plastic bins and set out for 24 hours to allow excess moisture to evaporate. Once the external moisture was removed from the coal, approximately 2 kg of coal was poured into a No. 10 sieve (2000 µm), which was attached to a No. 60 sieve (250 µm) and a collection pan and then covered with a lid. The coal sample was then shaken by hand for approximately 30 seconds, then the No. 10 sieve was removed and all of the coal in it was placed in a 5-gallon bucket. The lid was placed on the No. 60 sieve and the sample was shaken by hand for another 45 seconds. After shaking, any coal still in the No. 60 sieve was placed in a different 5-gallon bucket than the previous larger pieces, and the particles collected in the pan were weighed out into a 1-quart plastic bag. This process was repeated until all of the coal had been shaken. Once 400 g of coal <250 µm was in a bag, it was sealed and labeled and then filling resumed in a new bag. After shaking all of the coal, the finer particles that did not pass through the No. 60 sieve were crushed using a mortar and pestle. Once crushed, the coal was placed in the No. 60 sieve which was attached to the collection pan, covered with the lid and then shaken for 30 seconds. Anything that passed through the sieve was then weighed out into a bag as previously mentioned. Coal was crushed until a total of 2400 g of <250 μm particles had been collected. Added to the coal was a spontaneous combustion product comprising water, an anionic polyacrylamide, and an anionic surfactant. In this embodiment, the anionic surfactant is alpha olefin sulfonate. In this embodiment the water is added at 0.7485 gallons, the polyacrylamide at 0.926 lbs., and the surfactant at 0.2 gallons.

In another embodiment of the present invention the composition can be water, an anionic polyacrylamide, ammonium, calcium or sodium ligninsulfonate, and an amphoteric surfactant.

EXAMPLE 2 (FIGS. 1-7, and 13)

Abbreviations Used

OT=Oxygen Tank
NT=Nitrogen Tank
VO=Vacuum Oven
AO=Adiabatic Oven
PRB=Powder River Basin
SOP=Standard Operating Procedure
SC-#=Stopcock (numbers correspond to FIG. 2)
E-#=Exhaust (numbers correspond to FIG. 2, E-2 implies passing through the flow meter)

Acquiring and Preparing Coal Sample

There are multiple means of coal sample acquisition. Coal samples are either collected in 5-gallon buckets at the Powder River Basin or they are packaged and sent to Midwest by the mines' analysis labs. Large coal particles are removed from the buckets and crushed using a mortar and pestle. After crushing, the material is transferred to a 250-μm sieve, which is then placed in a collection pan and covered with a lid and hand-shaken for 1 minute. Everything that passes through the sieve is weighed out into a 100-mL beaker on an analytical balance. This is done until 135 g has been collected in the beaker. This process is performed prior to every test to assure that unreacted surfaces on the coal are exposed.

Drying Sample

The crushed test material in the 100-mL beaker is placed on an aluminum shelf in the vacuum oven. SC-1 is turned to be open to NT and SC-2. SC-2 is turned to allow flow from SC-1 to VO. The inlet valve on NT is closed (turned counter-clockwise until it turns freely), and the flow control valve and needle valve are kept closed (hand-tightened in the clockwise direction). The cylinder valve on NT is opened (the inlet pressure should appear on the inlet pressure gauge, but the flow control gauge should read "0"). The inlet valve on NT is then rotated clockwise until the flow control gauge reads "6 PSI," and then the flow control valve is opened (at least 3 rotations of the adjustor. [The vacuum/vent valve on VO is rotated to "EVACUATE" and then the vacuum pump is turned on. Once the pressure gauge on VO reads "−20 inHg" the vacuum/vent valve is turned to "CLOSED" and then the vacuum pump is shut off. Then the needle valve is opened slightly (¼ to ½ of a rotation) and the vacuum/vent valve on VO is rotated to "VENT." As soon as the vacuum gauge reads "−3 inHg," the needle valve is closed and the vacuum/vent valve on VO is rotated to "CLOSED."] The procedure in brackets is repeated nine more times for a total of ten vacuum/purging cycles. After the tenth cycle, VO is evacuated until the pressure gauge reads "−22 inHg." The cylinder valve on NT is closed. Turn SC-2 to allow flow from SC-1 to E-1 and then open the needle valve on NT completely to allow nitrogen to exit the regulator. Once both the inlet pressure gauge and the flow control gauge read "0," close the inlet, flow control and needle valves, and turn SC-2 back to allow flow from SC-1 to VO. The vacuum oven is now switched on and the temperature dial turned to 110° C. The sample is left to dry for 16 hours upon reaching 110° C. As the sample is drying the pressure in VO will increase due to gas expansion and evaporation of water present in the coal. Evacuate VO as necessary to maintain an internal pressure no more than 20 inHg (make sure that the pressure gauge reads between −10 and −20 inHg). After 16 hours the oven is turned off and allowed to sit for 3 hours, allowing the chamber to slowly cool. Then, after cooling for 3 hours, the VO is purged with nitrogen to bring the pressure to "−3 inHg," followed by a single vacuum/purging cycle as described in the brackets above, with the following exception: venting is stopped when the pressure gauge reads "0 inHg." The sample is then removed from the oven to be loaded into the sample chamber.

Loading Sample into the Adiabatic Oven

First, ensure that the top and bottom plate insulation are in place. Apply vacuum grease to the gasket and then stick it to the underside of the top plate, so that it surrounds the outer insulation. Then the pipe collar is inserted into the bottom sieve and the beaded probes are fed through the proper holes in the top plate and inserted into the holes in the pipe collar. The probe ends should reach the center of the sample chamber. Vacuum grease is then placed around the beaded probes where they enter the collar. (If the coal sample is to be treated with either water or chemical, do that now). The coal sample is transferred from the 100-mL beaker to the bottom sieve, and then the sample holder is sealed by fitting the upper sieve onto the pipe and pushing it down as far as possible. Next, the bottom sieve (the one housing the pipe) is placed into the bottom plate of the sample holder. The top plate is then placed on top of the upper sieve so that the all-thread from the tabs on the bottom plate passes through the proper holes in the top plate. Two washers are placed over the all-thread so that they rest on top of the top plate. The nuts are then hand-tightened down to the washers. The steel pallet with the other two all-threads is fitted over the hose barb on the bottom plate so that the all-threads pass through the top plate, and then the washers and nuts are placed on those all-threads. Again, these nuts are hand-tightened down to the top plate. All four nuts are tightened further using a socket wrench, making sure to alternate sides to prevent the chamber from torqueing between the two plates. After tightening the plates to create a tight seal throughout the entire reaction chamber, the chamber is set in the wooden support block and placed next to the adiabatic oven. The first heating cable is fed through the appropriate hole on the top plate and wrapped around the sieves, but underneath the all-threads. Insulation material is then wrapped around the sieves and heating cable, and also underneath the all-threads. An 18" piece of tygon tubing is then connected to inlet hose barb 2. The second heating cable is inserted through the top plate and wrapped around this tubing. Apply vacuum grease to the top of the Dewar flask inside the adiabatic oven. Then chamber is lifted off of the wooden support block, the free end of the 18" tygon tubing is connected to inlet hose barb 3 and the side insulation for the top of the reaction chamber is fitted over the bottom of the chamber. Lower the reaction chamber into the Dewar flask. Once the sample chamber is in place, the thermostat is inserted into the appropriate hole in the top plate so that the mark on the cable is at the entrance to the reaction chamber, the top plate insulation is put on the top plate, and then the insulation functioning as the lid to the apparatus is sealed. The tubing attached to the bottom of SC-3 is then attached to the inlet hose barb on the top plate of the adiabatic oven, and another piece of tubing is attached to the outlet hose barb on the adiabatic oven so that the outlet flow rate can be measured through E-3.

Running a Test

Ensure that the needle valve, flow control valve, and inlet valve on NT are closed and then open the cylinder valve. Then turn the inlet valve on the regulator to raise the value on the flow control gauge to "12.5 PSI." Turn SC-1 to allow flow from NT to SC-3, and turn SC-3 to allow flow from SC-1 to AO. Use tygon tubing to connect the outlet hose barb on AO to the hose connector on E-3 and turn SC-4 to allow flow from AO to E-2. Open the flow control valve on NT enough that the nitrogen flow form the regulator is determined solely by the needle valve. Open the needle valve slightly to get the ball float in the flow meter as close to the "11" mark as possible. Once close, the inlet valve can be either opened or closed more to make fine adjustments needed to reach the proper flow rate. The ball float needs to be steady at the "11," which corresponds to a flow rate of 9.807 mL/min. Make sure that the flow rate is stable for 5 minutes at "11." If the ball float is not reading where it should be, then adjust either the needle valve or inlet valve to reach the desired flow rate. Once stable at the desired flow rate, the heater is plugged in to allow the reaction chamber to warm up to the desired starting temperature. This starting temperature can be adjusted using the "up" and "down" arrows on the electronic temperature control unit. After plugging in the heater, the digital thermometer is plugged in and the software opened on the computer. Operate the digital thermometer and the data acquisition software according to their respective SOPs. Do not start collecting data at this point. The software should be set up to record the temperature between 20 and 60 second intervals (at analyst's discretion) and to record indefinitely so that the test must be ended manually. The tubing at the AO outlet is disconnected from the E-3 hose connector so that the outlet from the reaction chamber is open to ambient air (this allows any water vapor to escape the adiabatic oven). Make sure that the needle valve, flow control valve and inlet valve on OT are closed and then open the cylinder valve. Then turn the inlet valve on the regulator to raise the value on the flow control gauge to "12.5 PSI." Turn SC-6 to allow flow from OT to E-4. When the coal temperature (displayed on the digital thermometer) reaches the desired starting temperature, open the flow control valve and needle valve on OT. As soon as the temperature of the coal stabilizes near the desired temperature, begin collecting data with the thermometer logging software and collect data for 30 minutes while keeping the system under nitrogen. After 30 minutes, close the cylinder valve on NT, turn SC-3 to allow flow from SC-5 to AO, turn SC-6 to allow flow from OT to SC-5, turn SC-1 to allow flow from NT to SC-2 and turn SC-2 to allow flow from SC-1 to E-1. Completely open the needle valve on NT to allow the remaining nitrogen to leave the regulator. Once both the inlet pressure and flow control gauges read "OPSI" close the flow control valve, needle valve and inlet valve, in that respective order. Turn SC-2 to allow flow from SC-1 to VO. Reattach the tygon tubing between the outlet hose barb on the reaction chamber and the tubing connector at E-3. Make sure that SC-5 is turned to allow flow from E-3 to E-2. Adjust the needle valve on OT slightly to get the ball float in the flow meter as close to the "11" mark as possible. Once close, the inlet valve can be either opened or closed more to make fine adjustments needed to reach the proper flow rate. Make sure that the flow rate is stable for 5 minutes at "11." If the ball float is not reading where it should be, then adjust either the needle valve or inlet valve to reach the desired flow rate. Run test for 36 hours or until the coal reaches a temperature of 120° C. Follow the data acquisition software SOP in order to export and save data.

EXAMPLE 3 (FIGS. 1, 5, and 8-12)

Abbreviations Used

OT=Oxygen Tank
NT=Nitrogen Tank
VO=Vacuum Oven
AO=Adiabatic Oven
PRB=Powder River Basin
SOP=Standard Operating Procedure
SC-#=Stopcock (numbers correspond to FIG. 9)
NV-#=Needle Valve (numbers correspond to FIG. 9)
FM-#=Flow Meter (numbers correspond to FIG. 9)
E-#=Exhaust (numbers correspond to FIG. 9)

Acquiring and Preparing Coal Sample

There are multiple means of coal sample acquisition. Coal samples are either collected in 5-gallon buckets at the Powder River Basin or they are packaged and sent to Midwest by the mines' analysis labs. Large coal particles are removed from the buckets and crushed using a mortar and pestle until the particles are no larger than a pea. Then the sample is placed in a coffee grinder to further break down the particles into a fine powder. After crushing, the material is transferred to a 250-μm sieve, which is stacked on top of a collection pan and covered with a lid and hand-shaken for ~30 seconds. Everything that passes through the sieve is weighed out into a 1000-mL beaker on an analytical balance. This is done until 135 g has been collected in the beaker. This process is performed prior to every test to assure that unreacted surfaces on the coal are exposed, and to ensure that each test utilizes both the same amount of coal and the same coal particle size.

Drying Sample

The crushed test material in the 1000-mL beaker is placed on an aluminum shelf in the vacuum oven. SC-6 is turned to be open to NT and SC-7. SC-7 is turned to allow flow from SC-6 to VO. The inlet valve on NT is closed (turned counterclockwise until it turns freely), and the flow control valve is kept closed (hand-tightened in the clockwise direction). The cylinder valve on NT is opened (the inlet pressure should appear on the inlet pressure gauge, but the flow control gauge should read "0"). The inlet valve on NT is then rotated clockwise until the flow control gauge reads "6 PSI." [The vacuum/vent valve on VO is rotated to "EVACUATE" and then the vacuum pump is turned on. Once the pressure gauge on VO reads "−15 inHg" the vacuum/vent valve is turned to "CLOSED" and then the vacuum pump is shut off. Then the flow control valve is opened slightly (¼ to ½ of a rotation) and the vacuum/vent valve on VO is rotated to "VENT." As soon as the vacuum gauge reads "−3 inHg," the flow control valve is closed and the vacuum/vent valve on VO is rotated to "CLOSED."] The procedure in brackets is repeated fourteen more times for a total of fifteen vacuum/purging cycles. After the fifteenth cycle, VO is evacuated until the pressure gauge reads "−20 inHg." The cylinder valve on NT is closed. Turn SC-7 to allow flow from SC-6 to E-2 and then open the flow control valve on NT completely to allow nitrogen to exit the regulator. Once both the inlet pressure gauge and the flow control gauge read "0," close the inlet and flow control valves, and turn SC-7 back to allow flow from SC-6 to VO. The vacuum oven is now switched on and the temperature dial turned to 110° C. The sample is left to dry for 16 hours upon reaching 110° C. As the sample is drying the pressure in VO will increase due to gas expansion and evaporation of water present in the coal. Evacuate VO as necessary to maintain an internal pressure no more than 20 inHg (make sure that the pressure gauge reads between −10 and −20 inHg). After 16 hours the oven is turned off and allowed to sit for 1 hour, allowing the chamber to slowly cool. Then, after cooling for 1 hour, the VO is purged with nitrogen to bring the pressure to "−3 inHg," followed by a single vacuum/purging cycle as described in the brackets above, with the following exception: venting is stopped when the pressure gauge reads "0 inHg." With the flow control valve closed, adjust the inlet valve so that the pressure on the flow control gauge reads "15 PSI." Turn SC-6 to allow flow from NT to SC-1-4. Turn SC-1-4 to allow flow from SC-6 to their respective precision needle valves. Make sure that the precision needle valves are closed, and then open the flow control valve. The sample is then removed from the oven to be loaded into the test chamber.

Loading Sample into the Test Chamber and Adiabatic Oven

Remove the cap from the test chamber and make sure that the gaskets, mesh, and spacer are inside the chamber. Treat and mix the coal sample as required. Place the funnel on top of the test chamber and transfer the coal sample from the 1000-mL beaker to the test chamber. Hand-tighten the cap onto the chamber as far as possible. Insert the chamber into the adiabatic oven, insert the corresponding temperature probe through the cap of the test chamber, and connect the 180° tubing connector attached to the test chamber inlet hose to the corresponding hose on the lattice. As soon as the tubing is attached, open the corresponding precision needle valve to allow a nitrogen flow rate of 10 mL/min (the "11" mark on the flow meter). Once all four samples have been loaded, testing can be performed.

Running a Test

Turn on the digital thermometers, set them to measure to the tenths place in ° C., and then press "Record." Open the data acquisition software on the computer and open the "Capture" window, the temperatures observed on the thermometers should appear in the window. Consult the digital thermometer and data acquisition software SOPs as necessary. Set the thermostat on the electronic temperature control unit to the desired starting temperature for the test. Once all of the temperatures have equilibrated at the desired starting temperature, set the record interval for 20 seconds and then press "Record." Collect data for at least 30 minutes under nitrogen to establish a baseline temperature for each sample. Once ready to test, Open the cylinder valve on OT. Open the inlet valve until the flow control gauge pressure reads "15 PSI." Then open the flow control valve and needle valve, and make sure that SC-5 is turned to allow flow from OT to the lattice. [As soon as a data point is collected (shown under the interval time in the "Capture" window of the data acquisition software) turn SC-1 to allow flow from SC-5 to test chamber 1, taking note of the data point number after which the oxygen had been introduced.] Repeat the procedure in brackets for SC-2-4. Once a sample reaches 200° C., turn the respective SC necessary to reintroduce nitrogen to the test chamber. As soon as all samples have reached 200° C., press "Stop" in the "Capture" window of the data acquisition software to stop recording data, close all precision needle valves, close both the NT and OT cylinder valves, and turn SC-1 -4 to allow flow from SC-6 to their respective precision needle valves. Turn SC-5 to open all 3 tubes, allowing excess pressure in both the inlet hose and lattice to be released through E-1. Once the flow control and inlet pressure gauges on OT have dropped to "OPSI," turn SC-5 to allow flow from OT to the lattice. Turn SC-7 to allow flow from SC-6 to E-2, and then turn SC-6 to open all 3 tubes, allowing excess pressure in both the inlet hose and lattice to be released through E-2. Once the flow control and inlet pressure gauges on NT have dropped to "OPSI," turn SC-7 to allow flow from SC-6 to VO. Follow the data acquisition software SOP in order to export and save data.

Although the description above contains much specificity, these should not be construed as limiting the scope of the invention but as merely providing illustrations of this invention. Various other embodiments and ramifications are possible within its scope.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The invention has been described with reference to several embodiments. Obviously, modifications and alterations will occur to others upon a reading and understanding of the specification. It is intended by applicant to include all such modifications and alterations insofar as they come within the scope of the appended claims or the equivalents thereof

Having thus described the invention, it is now claimed:

Having thus described the invention, it is now claimed:

1. A composition for inhibiting oxidation, the composition comprising:
   anionic polyacrylamide; and,
   sodium alpha olefin sulfonate, wherein the composition does not contain a solvent.

2. The composition of claim 1, wherein the polyacrylamide is either synthetic or a naturally occurring biopolymer.

3. The composition of claim 1, wherein the polyacrylamide is between 0.1% and 20% by weight, and the sodium alpha olefin sulfonate is between about 2% and about 38% by weight.

4. The composition of claim 3, wherein the polyacrylamide is about 10% by weight, and the sodium alpha olefin sulfonate is about 8% by weight.

5. A. composition for inhibiting oxidation, the composition comprising:
   anionic polyacrylamide;
   sodium dioctyl sulfosuccinate;
   a co-solvent; and,
   water.

6. The composition of claim 5, wherein the co-solvent is chosen from the group consisting of: diethylene glycol/isopropyl alcohol, diethylene glycol/ethanol, glycerin/isopropyl alcohol, and glycerin/ethanol.

7. The composition of claim 5, wherein polyacrylamide is between about 0.1% and about 20% by weight, the sodium dioctyl sulfosuccinate is between about 0.4% and about 4.8% by weight, the co-solvent is between about 1.0% and about 11.1% by weight, and the water is between about 64.1% and 98.5% by weight.

8. The composition of claim 7, wherein the co-solvent is diethylene glycol and isopropyl alcohol, wherein the diethylene glycol is between about 0.9% and about 10.5% by weight and the isopropyl alcohol is between about 0.1% and about 0.6% by weight.

* * * * *